(12) United States Patent
Hayes

(10) Patent No.: US 10,279,783 B1
(45) Date of Patent: May 7, 2019

(54) ICE-REMOVING DEVICE

(71) Applicant: Robert Hayes, Indianapolis, IN (US)

(72) Inventor: Robert Hayes, Indianapolis, IN (US)

(*) Notice: Subject to any disclaimer, the term of this patent is extended or adjusted under 35 U.S.C. 154(b) by 137 days.

(21) Appl. No.: 15/402,541

(22) Filed: Jan. 10, 2017

(51) Int. Cl.
A46B 11/06 (2006.01)
B60S 3/04 (2006.01)

(52) U.S. Cl.
CPC .............. B60S 3/047 (2013.01); B60S 3/044 (2013.01); B60S 3/045 (2013.01)

(58) Field of Classification Search
CPC ........... B60S 3/044; B60S 3/045; B60S 3/047
USPC ......................................... 401/289
See application file for complete search history.

(56) References Cited

U.S. PATENT DOCUMENTS

| 3,898,429 A | 8/1975 | Chodak |
| D386,852 S | 11/1997 | Viner |
| 6,283,656 B1 | 9/2001 | Jiang |
| 6,538,235 B2 | 3/2003 | Lopez |
| 6,969,828 B2 * | 11/2005 | Deane, III .............. B60S 3/045 219/227 |
| 7,832,955 B1 | 11/2010 | Leffew |
| 8,109,685 B1 * | 2/2012 | Vito ..................... A46B 5/0095 401/188 R |
| 8,344,290 B1 | 1/2013 | Hinton |
| 2005/0031404 A1 | 2/2005 | Tsai |
| 2006/0251465 A1 | 11/2006 | Savoia |
| 2007/0297846 A1 * | 12/2007 | Le Van ..................... A46B 7/04 401/140 |

FOREIGN PATENT DOCUMENTS

CA 2288353 A1 9/2001

* cited by examiner

Primary Examiner — Jennifer C Chiang

(57) ABSTRACT

The ice-removing device is configured to remove ice from the exterior surface of a vehicle. Specifically, the ice-removing device is an apparatus that applies an ice-removing chemical to the exterior surface of the vehicle for the purpose of removing the accumulation of ice on the vehicle. The ice-removing device comprises a reservoir, a hose, a pump, a removal device and a deicing fluid. The pump transports the deicing fluid from the reservoir through the hose to the vehicle. The removal device is a structure that is designed to scrap and move ice that has accumulated on the vehicle. The removal device is mounted on the outlet port of the pump such that the deicing fluid flows through the removal device.

12 Claims, 4 Drawing Sheets

ICE-REMOVING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and servicing of vehicles, more specifically, an apparatus for cleaning vehicle windshields that uses liquid.

SUMMARY OF INVENTION

The ice-removing device is configured to remove ice from the exterior surface of a vehicle. Specifically, the ice-removing device is an apparatus that applies an ice-removing chemical to the exterior surface of the vehicle for the purpose of removing the accumulation of ice on the vehicle. The ice-removing device comprises a reservoir, a hose, a pump, a removal device and a deicing fluid. The pump transports the deicing fluid from the reservoir through the hose to the vehicle. The removal device is a structure that is designed to scrap and move ice that has accumulated on the vehicle. The removal device is mounted on the outlet port of the pump such that the deicing fluid flows through the removal device.

These together with additional objects, features and advantages of the ice-removing device will be readily apparent to those of ordinary skill in the art upon reading the following detailed description of the presently preferred, but nonetheless illustrative, embodiments when taken in conjunction with the accompanying drawings.

In this respect, before explaining the current embodiments of the ice-removing device in detail, it is to be understood that the ice-removing device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ice-removing device.

It is therefore important that the claims be regarded as including such equivalent construction insofar as they do not depart from the spirit and scope of the ice-removing device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
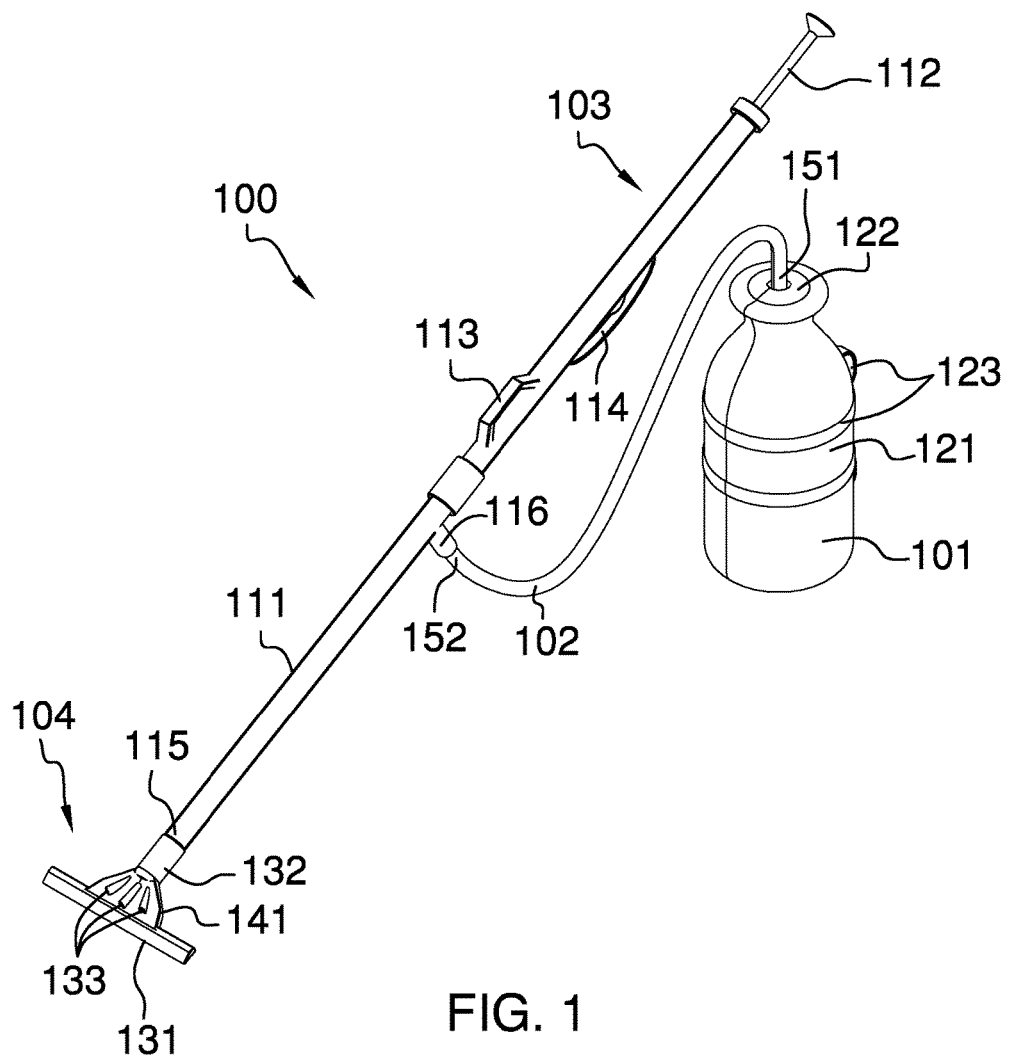
FIG. 1 is a perspective view of an embodiment of the disclosure.
Figure 2:
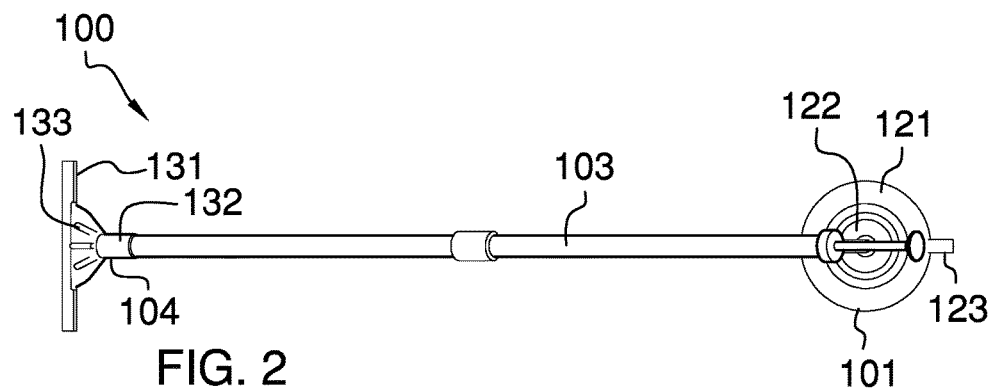
FIG. 2 is a front view of an embodiment of the disclosure.
Figure 3:
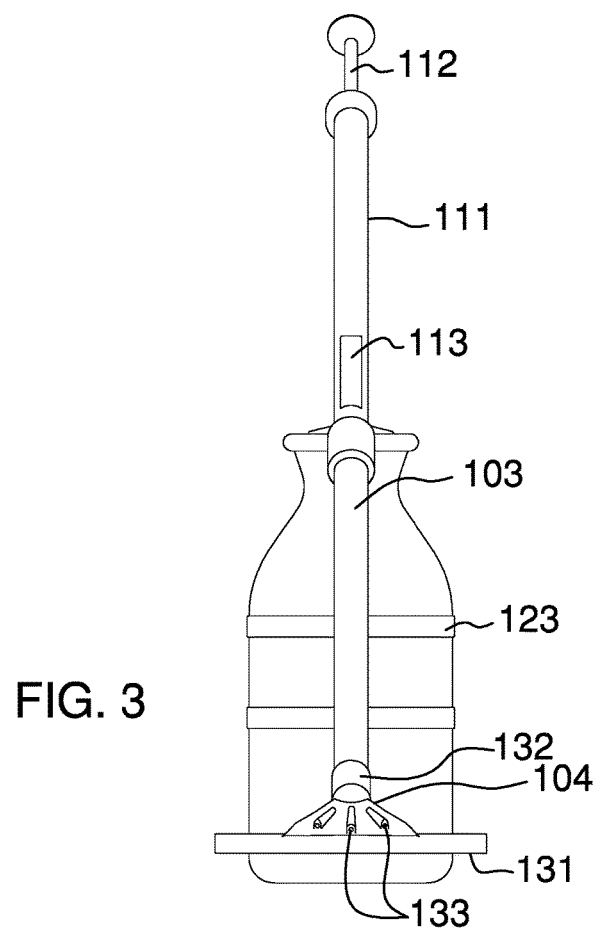
FIG. 3 is a side view of an embodiment of the disclosure.
Figure 4:
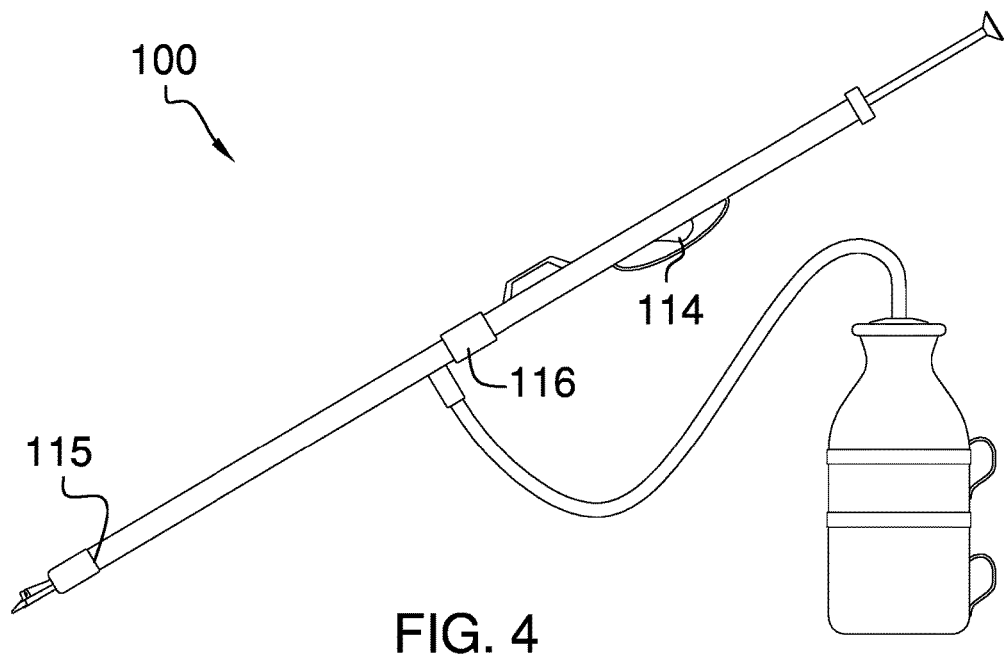
FIG. 4 is a detail view of an embodiment of the disclosure.
Figure 5:
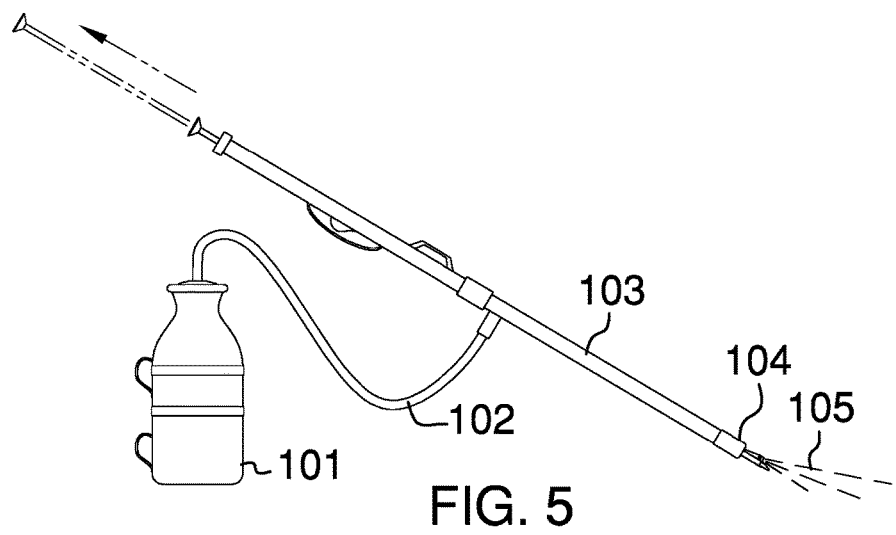
FIG. 5 is an in use view of an embodiment of the disclosure.
Figure 6:
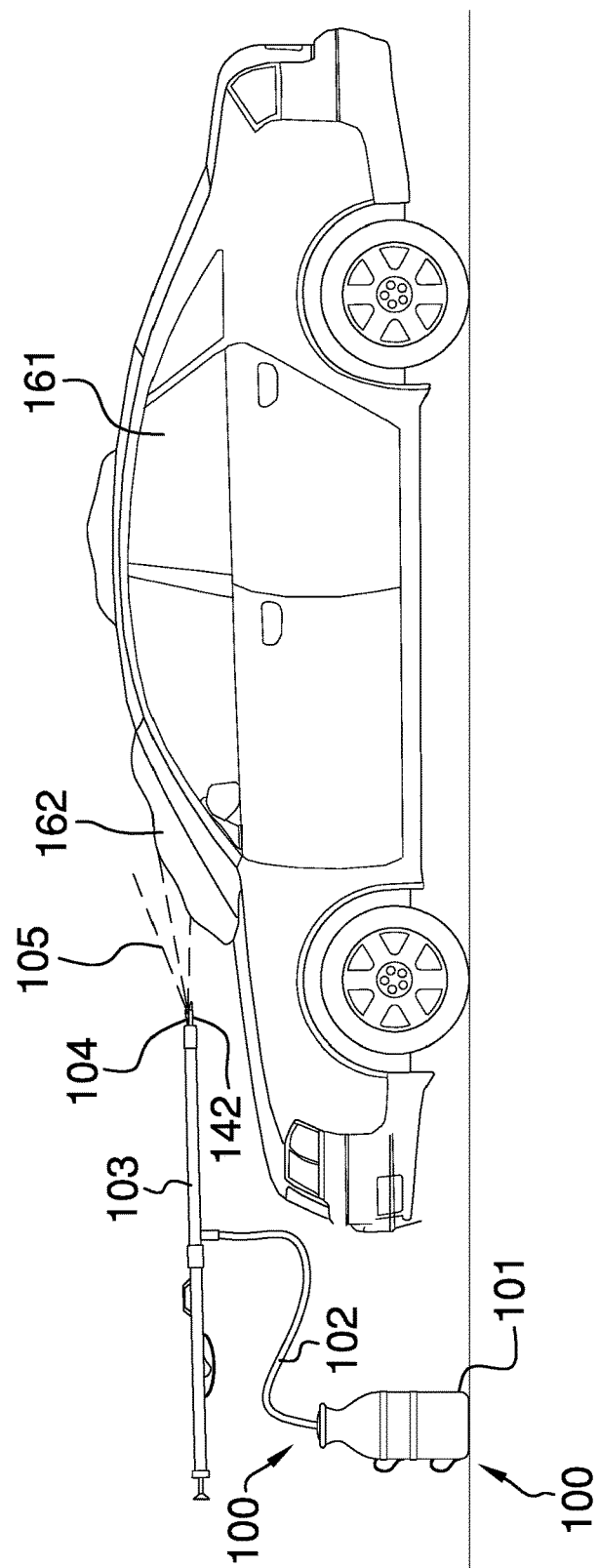
FIG. 6 is an in use view of an embodiment of the disclosure.

Detailed reference will now be made to one or more potential embodiments of the disclosure, which are illustrated in FIGS. 1 through 6.

The ice-removing device 100 (hereinafter invention) is configured to remove ice 162 from the exterior surface of a vehicle 161. Specifically, the invention 100 is an apparatus that applies an ice 162 removing chemical to the exterior surface of the vehicle 161 for the purpose of removing the accumulation of ice 162 on the vehicle 161. The invention 100 comprises a reservoir 101, a hose 102, a pump 103, a removal device 104 and a deicing fluid 105. The pump 103 transports the deicing fluid 105 from the reservoir 101 through the hose 102 to the removal device 104. The removal device 104 is a structure that is designed to scrap and move ice 162 that has accumulated on the vehicle 161. The removal device 104 is mounted on the outlet port 115 of the pump 103 such that the deicing fluid 105 flows through or around the removal device 104.

The reservoir 101 is an apparatus that contains and stores the deicing fluid 105 in anticipation of use. The reservoir 101 comprises a bottle 121, a neck 122, and one or more handles 123. The bottle 121 is a water impermeable container within which the deicing fluid 105 is physically contained. The neck 122 is an aperture through which the deicing fluid 105 is added or removed. The one or more handles 123 are hand grips that is mounted on the container 121. The one or more handles 123 are used to carry the reservoir 101 during use of the invention 100.

The hose 102 is a flexible cylindrical device that is used to transport the deicing fluid 105 from the reservoir 101 to the pump 103. Hoses are readily and commercially available. The hose 102 is further defined with a first end 151 and a second end 152. The first end 151 of the hose 102 attaches to the neck 122 of the reservoir 101. The second end 152 of the hose 102 attaches to the inlet port 116 of the pump 103.

The pump 103 is a mechanical device that creates pressure differentials, which are used to transport the deicing fluid 105 from the reservoir 101 through the hose 102 to the removal device 104. The design, installation, and use of pumps are well known and documented in the mechanical, chemical and plumbing arts. The pump 103 comprises a body 111, a plunger 112, a pump handle 113, and a trigger 114.

The body 111 of the pump 103 is both: 1) the primary structure of the pump 103; and, 2) a chamber within which the deicing fluid 105 is transported as a result of pressure differentials generated within the body 111. The plunger 112 of the pump 103 is a piston that is installed within the body 111 of the pump 103. The movement of the plunger 112 generates the pressure differentials that are used to transport the deicing fluid 105 from the reservoir 101 to the removal device 104. The pump handle 113 is a hand grip that is mounted on the pump 103. The pump handle 113 is used to carry and manipulate the pump 103 during use of the invention 100.

The trigger 114 is a valve that is used to control the flow of deicing fluid 105 through the outlet port 115. The outlet port 115 is an aperture through which the deicing fluid 105 exits the pump 103 to the removal device 104. The inlet port 116 is an aperture through which the deicing fluid 105 enters the pump 103 from the hose 102.

The removal device 104 is a tool that is used to remove detritus, such as ice 162, from the vehicle 161. The removal device 104 comprises a scraping tool 131, a plug 132, and plurality of nozzles 133.

The scraping tool 131 is the structure of the removal device 104 that physically removes the ice 162 from the vehicle 161. The scraping tool 131 is modified as described elsewhere in this disclosure such that the scraping tool 131 will distribute deicing fluid 105 to the vehicle 161.

The plug 132 is a structure that receives deicing fluid 105 under pressure from the outlet port 115 of the pump 103. The plug 132 transports the deicing fluid 105 from the plug 132 to the plurality of nozzles 133. The plurality of nozzles 133 is a device that receives deicing fluid 105 under pressure from the plug 132 and disperses the deicing fluid 105 directly on to the vehicle 161. Methods to design and use nozzles for this purpose are well known in the mechanical, chemical, and plumbing arts.

The plug 132 of the removal device 104 attaches to the outlet port 115 of the pump 103. In the first potential embodiment of the disclosure, the scraping tool 131 is selected from the group consisting of a squeegee 141 or an ice 162 scraper 142. The squeegee 141 is a readily and commercially available product that is used for removing water from a glass or other smooth surface. The ice 162 scraper 142 is a readily and commercially available bladed product that is used for scraping detritus such as ice 162 from a glass or other smooth surface.

The deicing fluid 105 is a readily and commercially available chemical that is in a liquid phase. The deicing fluid 105 comprises a primary active ingredient, which interacts with ice 162 in a manner that facilitates the removal of ice 162 by the removal device 104. The performance and efficacy of the deicing fluid 105 may be enhanced through the addition of surfactants, buffers, stabilizers, or flame retardants.

In the first potential embodiment of the disclosure, the primary active ingredient contained within the deicing fluid 105 is selected from the group consisting of methanol (CAS 67-56-1), ethylene glycol (CAS 107-21-2), propylene glycol (CAS 57-55-2), or glycerol (CAS 56-81-5). Methanol (CAS 67-56-1) is a commercially available chemical product. Ethylene glycol (CAS 107-21-2) is a commercially available chemical product. Propylene glycol (CAS 57-55-2) is a commercially available chemical product. Due to its relatively low toxicity, the use of propylene glycol (CAS 57-55-2) is preferred over methanol (CAS 67-56-1) and ethylene glycol (CAS 107-21-2). Glycerol (CAS 56-81-5) is a commercially available chemical product. The use of glycerol (CAS 56-81-5) is preferred overall for its non-toxic nature.

The following definitions were used in this disclosure:

Blade: As used in this disclosure, a blade is a term that is used to describe: 1) a wide and flat portion of a structure; or, 2) the cutting edge of a tool.

Bottle: As used in this disclosure, a bottle is a container used for the storage of fluids. Access to the interior of a bottle is gained through the neck of the bottle. The neck is an elongated tube that forms an aperture through which fluids can be introduced and removed from the bottle.

Ethylene Glycol: As used in this disclosure, ethylene glycol (CAS 107-21-2) is a name for the chemical formula $(CH_2OH)_2$. Ethylene glycol is more formally referred to as ethane-1,2-diol. In commercial settings, ethylene glycol is commonly referred to as antifreeze.

Glycerol: As used in this disclosure, glycerol (CAS 56-81-5) is a name for the chemical 1,2,3 propanetriol, which has the chemical formula $CH_2OHCHOHCH_2OH$.

Handle: As used in this disclosure, a handle is an object by which a tool, object, or door is held or manipulated with the hand.

Hose: As used in this disclosure, a hose is a flexible hollow cylindrical device that is used for transporting liquids and gases.

Methanol: As used in this disclosure, methanol (CAS 67-56-1) is a chemical substance with the chemical formula CH2O3.

Nozzle: As used in this disclosure, a nozzle is a device that receives liquid under pressure and disperses that liquid into the atmosphere as a spray.

Propylene Glycol: As used in this disclosure, propylene glycol (CAS 57-55-2) is the name for the chemical formula $CH_2OHCHOHCH_3$. Propylene glycol is more formally referred to as propane-1,2-diol.

Pump: As used in this disclosure, a pump is a mechanical device that uses suction or pressure to raise or move liquids, compress gases, or force a gas into an inflatable object.

Squeegee: As used in this disclosure, a squeegee is a T shaped tool formed with a rubber edged crosspiece that is used for removing water from a window.

Trigger: As used in this disclosure, a trigger is a lever that operates in conjunction with a spring or similar device such that: 1) the lever is used to activate a mechanism; and 2) the spring or similar device returns the lever to its original position after the mechanism has been activated.

Valve: As used in this disclosure, a valve is a device that is use to control the flow of a fluid (gas or liquid) through a pipe.

Vehicle: As used in this disclosure, a vehicle is a motorized device that is used transporting carrying passengers, goods, or equipment.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An apparatus for cleaning the exterior surface of a vehicle comprising:
    wherein the apparatus for cleaning the exterior surface of a vehicle comprises a reservoir, a hose, a pump, a removal device and a deicing fluid;
    wherein the pump transports the deicing fluid from the reservoir through the hose to the removal device;
    wherein the apparatus for cleaning the exterior surface of a vehicle is configured to remove ice from the exterior surface of a vehicle;
    wherein the apparatus for cleaning the exterior surface of a vehicle applies the deicing fluid to the exterior surface of the vehicle for the purpose of removing the accumulation of ice on the vehicle;
    wherein the removal device is the structure that scrapes and removes ice that has accumulated on the vehicle;
    wherein the removal device is mounted on the pump such that the deicing fluid flows through the removal device;
    wherein the reservoir is an apparatus that contains and stores the deicing fluid in anticipation of use;
    wherein the reservoir comprises a bottle, a neck, and one or more handles;
    wherein the bottle is a water impermeable container within which the deicing fluid is physically contained;
    wherein the neck is an aperture through which the deicing fluid is added or removed;
    wherein the one or more handles are hand grips that is mounted on container;
    wherein the hose is a flexible cylindrical device that transport the deicing fluid from the reservoir to the pump;
    wherein the hose is further defined with a first end and a second end;
    wherein the first end of the hose attaches to the neck of the reservoir;
    wherein the second end of the hose attaches to the inlet port of the pump;
    wherein the pump is a mechanical device that creates pressure differentials which are used to transport the deicing fluid from the reservoir through the hose to the removal device;
    wherein the pump comprises a body, a plunger, a pump handle, and a trigger;
    wherein the plunger, the pump handle, and the trigger are attached to the body;
    wherein the body of the pump is the primary structure of the pump;
    wherein the body of the pump is a chamber through which the deicing fluid is transported;
    wherein the plunger of the pump is a piston that is installed within the body of the pump;
    wherein the movement of the plunger generates the pressure differentials that are used to transport the deicing fluid from the reservoir to the removal device;
    wherein the pump handle is a hand grip that is mounted on the pump;
    wherein the pump further comprises an outlet port;
    wherein the trigger is a valve that is used to control the flow of deicing fluid through the outlet port;
    wherein the outlet port is an aperture through which the deicing fluid exits the pump to the removal device.

2. The apparatus for cleaning the exterior surface of a vehicle according to claim 1
    wherein the pump further comprises an inlet port;
    wherein the inlet port is an aperture through which the deicing fluid enters the pump from the hose.

3. The apparatus for cleaning the exterior surface of a vehicle according to claim 2
    wherein the removal device is a tool that removes detritus from the vehicle;
    wherein the removal device comprises a scraping tool, a plug, and plurality of nozzles;
    wherein the plug and the plurality of nozzles are attached to the scraping tool.

4. The apparatus for cleaning the exterior surface of a vehicle according to claim 3
    wherein the scraping tool is the structure of the removal device that physically removes the ice from the vehicle;
    wherein the scraping tool is selected from the group consisting of a squeegee or an ice scraper.

5. The apparatus for cleaning the exterior surface of a vehicle according to claim 4 wherein the plug receives deicing fluid under pressure from the outlet port of the pump.

6. The apparatus for cleaning the exterior surface of a vehicle according to claim 5 wherein the plug transports the deicing fluid from the plug to the plurality of nozzles.

7. The apparatus for cleaning the exterior surface of a vehicle according to claim 6 wherein the plurality of nozzles receives deicing fluid under pressure from the plug and disperses the deicing fluid directly on to the vehicle.

8. The apparatus for cleaning the exterior surface of a vehicle according to claim 7 wherein the plug of the removal device attaches to the outlet port of the pump.

9. The apparatus for cleaning the exterior surface of a vehicle according to claim 8
    wherein the deicing fluid is chemical that is in a liquid phase;
    wherein the deicing fluid comprises a primary active ingredient which interacts with ice in a manner that facilitates the removal of ice by the removal device.

10. The apparatus for cleaning the exterior surface of a vehicle according to claim 9 wherein the primary active ingredient contained within the deicing fluid is selected from the group consisting of methanol (CAS 67-56-1) or ethylene glycol (CAS 107-21-2).

11. The apparatus for cleaning the exterior surface of a vehicle according to claim 9 wherein the primary active ingredient consists of propylene glycol (CAS 57-55-2).

12. The apparatus for cleaning the exterior surface of a vehicle according to claim 9 wherein the primary active ingredient contained within the deicing fluid consists of glycerol (CAS 56-81-5).

* * * * *